(12) United States Patent
Lim

(10) Patent No.: US 10,487,783 B2
(45) Date of Patent: Nov. 26, 2019

(54) SYSTEM FOR REDUCING FUEL CONSUMPTION AND INCREASING OUTPUT OF INTERNAL COMBUSTION ENGINE USING OUTPUT-WAVE

(71) Applicant: Yun Sik Lim, Busan (KR)

(72) Inventor: Yun Sik Lim, Busan (KR)

( * ) Notice: Subject to any disclaimer, the term of this patent is extended or adjusted under 35 U.S.C. 154(b) by 21 days.

(21) Appl. No.: 16/066,679

(22) PCT Filed: Jan. 3, 2017

(86) PCT No.: PCT/KR2017/000035
§ 371 (c)(1),
(2) Date: Jun. 28, 2018

(87) PCT Pub. No.: WO2017/119691
PCT Pub. Date: Jul. 13, 2017

(65) Prior Publication Data
US 2019/0017472 A1   Jan. 17, 2019

(30) Foreign Application Priority Data

Jan. 4, 2016 (KR) .................. 10-2016-0000691
Dec. 29, 2016 (KR) .................. 10-2016-0182791

(51) Int. Cl.
*F02M 27/08* (2006.01)
*F02M 27/04* (2006.01)
(Continued)

(52) U.S. Cl.
CPC ......... *F02M 27/04* (2013.01); *F02D 41/0002* (2013.01); *F02M 25/028* (2013.01);
(Continued)

(58) Field of Classification Search
CPC ...... F02M 27/04; F02M 27/08; F02M 25/028; F02M 25/12; F02D 41/0002; F02D 2200/0418
(Continued)

(56) References Cited

U.S. PATENT DOCUMENTS 8,640,677 B2 * 2/2014 Gonzales ............... F02M 27/04
123/536
9,157,387 B2 * 10/2015 Lim ........................ F02D 29/02
2015/0013641 A1 1/2015 Lim

FOREIGN PATENT DOCUMENTS

JP   2007-530849 A   11/2007
KR   10-0783825 B1   12/2007
(Continued)

OTHER PUBLICATIONS

International Search Report for PCT/KR2017/000035 dated Apr. 28, 2017 from Korean Intellectual Property Office.

*Primary Examiner* — Hai H Huynh
(74) *Attorney, Agent, or Firm* — Revolution IP, PLLC

(57) ABSTRACT

There is provided a system for reducing fuel consumption and increasing output of an internal combustion engine using an output-wave, the system comprising: an output-wave generation and amplification device configured to generated an amplified output-wave; an output-wave transmitter connected to the output-wave generation and amplification device for transmitting an output-wave to an air intake channel of an internal combustion engine, wherein the output-wave transmitter is inserted into the channel; an output-wave adjuster configured to adjust the output-wave from the output-wave generation and amplification device, wherein the output-wave adjuster is disposed between the output-wave transmission terminal and the output-wave transmitter.

6 Claims, 7 Drawing Sheets

(51) Int. Cl.
*F02M 25/12* (2006.01)
*F02D 41/00* (2006.01)
*F02M 25/028* (2006.01)

(52) U.S. Cl.
CPC ............ *F02M 25/12* (2013.01); *F02M 27/08* (2013.01); *F02D 2200/0418* (2013.01)

(58) Field of Classification Search
USPC ........ 123/536, 537, 539, 542, 556, 585, 587
See application file for complete search history.

(56) References Cited

FOREIGN PATENT DOCUMENTS

| | | |
|---|---|---|
| KR | 10-2010-0019554 A | 2/2010 |
| KR | 10-2010-0028158 A | 3/2010 |
| KR | 10-2010-0093936 A | 8/2010 |
| KR | 10-1247539 B1 | 3/2013 |
| KR | 10-1334421 B1 | 11/2013 |

\* cited by examiner (a)　　　　　　　　　　(b)

(a)

(b)

SYSTEM FOR REDUCING FUEL CONSUMPTION AND INCREASING OUTPUT OF INTERNAL COMBUSTION ENGINE USING OUTPUT-WAVE

TECHNICAL FIELD

The present disclosure relates to a system for reducing fuel consumption and increasing output of an internal combustion engine using an output wave. More particularly, the present disclosure relates to a system for reducing fuel consumption and increasing output of an internal combustion engine using an output wave, wherein by decomposing moisture in air sucked into an air intake channel of the engine into oxygen and hydrogen, the hydrogen and oxygen can be completely burned in the internal combustion engine, and, as a result, compared with the prior art, the fuel consumption efficiency increases and the output increase can be maximized, and further, corrosion of the internal combustion engine can be prevented by removing moisture from the air.

BACKGROUND ART

Generally, an internal combustion engine that generates power in automobiles, airplanes, ships, etc. operates by the combustion reaction of fuel and air via intake, compression, explosion, and exhaust strokes. The efficiency thereof depends on amount of the combustion reaction between the fuel and air for a given time.

In other words, in order to reduce the fuel used in an internal combustion engine, combustion efficiency close to that of complete combustion is required. Further, in order to improve power and reduce exhaust gas, a catalyst or a magnet is placed on a fuel pipe or means for activating air required for combustion is used.

As means for activating the air, fine currents may be used to vibrate conductive plates as in Patent Documents 1 and 2. In these documents, a first copper plate, a second copper plate and the conductive plates are connected to both ends of a coil to form an amplifier. The vibration of the conductor plate promotes the ionization of the air entering the internal combustion engine. This improves the combustion efficiency and removes the carbon or contaminants attached to the pipe. As a result, heat circulation and heat transfer are smoothly performed, thereby saving fuel.

However, conventionally, in the combustion efficiency reducing method, air is forcedly injected or fuel additives and the like are further used to improve combustion efficiency. In this connection, there is a need to remove carbon or contaminants by a physical way in order to facilitate heat transfer.

Also, in Patent Document 3, an AM frequency having a strong vibration is received and amplified, and the amplified frequency is applied to the current circuit of the gas activation enhancer. This causes the conductor plate of the gas activation enhancer to vibrate, thereby resonating the atoms in the air to increase the combustion efficiency of the fuel.

However, in this approach, when the AM frequency having a strong vibration is received and amplified, and the amplified frequency is applied to the current circuit of the gas activation enhancer, it is difficult to select the frequency that suits the individual characteristics of the enhancer. Further, the enhancer is influenced by external noise.

On the other hand, due to the depletion of fossil fuels, hydrogen energy is attracting attention as clean energy. Hydrogen is present in water, coal, oil, natural gas, and wood, but it is difficult to decompose hydrogen from them. In addition, when hydrogen is produced from coal, petroleum, natural gas, and wood, $CO_2$, which is a cause of greenhouse gas, and combustion gas, etc. are produced in the hydrogen generation process. This leads to another pollution problem.

Therefore, the advanced countries determine that the method of decomposing water among the various methods of producing hydrogen is the best. However, bonds in water ($H_2O$) do not break because two hydrogens (H) and one oxygen (O) are connected with each other to form a rigid chemical structure.

On the other hand, in recent years, instead of the method of charging the device by transmitting electric power to the electric wire, electric power is wirelessly transmitted through the atmosphere to charge the device. This method is called wireless charging. These wireless charging methods are classified into an inductive charging type and resonant charging type.

In the inductive charging system, when a transmitting coil generates a magnetic field, the magnetic field induces a current in the receiving coil to supply the current. That is, the electromagnetic induction principle is used. Therefore, the coil must be located at a close distance.

This magnetic induction method has an advantage that the power transmission efficiency is 90% or more and is very high. However, when the transmit coil and the receive coil are far apart, or when their centers do not exactly coincide, little power is transmitted.

In the resonant inductive coupling system, the transmission unit generates the resonance frequency, and the energy is concentrated only toward and transmitted only to the reception unit designed with the same resonance frequency. This is a resonance induction method. In this method, a frequency of several MHz to several tens MHz is used to generate magnetic resonance to transmit the power.

Using the resonance induction method among these two methods, a frequency of several MHz to several tens MHz (hereinafter, referred to as an output-wave) is applied to an air intake channel of an internal combustion engine. This effectively decomposes the moisture in the air in the channel to oxygen and hydrogen. The oxygen and hydrogen decomposed from the moisture in the air are supplied to the internal combustion engine.

PRIOR ART LITERATURE

Patent Literature (Patent Document 1) KR 10-0783825 B1
(Patent Document 2) KR 10-2010-0093936 A
(Patent Document 3) KR 10-1334421 B1

DISCLOSURE

Technical Problem

The present disclosure to provide a system for reducing fuel consumption and increasing output of an internal combustion engine using an output wave, wherein by decomposing moisture in air sucked into an air intake channel of the engine into oxygen and hydrogen, the hydrogen and oxygen can be completely burned in the internal combustion engine, and, as a result, compared with the prior art, the fuel consumption efficiency increases and the output increase can be maximized, and further, corrosion of the internal combustion engine can be prevented by removing moisture from the air.

Technical Solution

In one aspect, there is provided a system for reducing fuel consumption and increasing output of an internal combustion engine using an output-wave, the system comprising: an output-wave generation and amplification device configured to generated an amplified output-wave; an output-wave transmitter connected to the output-wave generation and amplification device for transmitting an output-wave to an air intake channel of an internal combustion engine, wherein the output-wave transmitter is inserted into the channel; an output-wave adjuster configured to adjust the output-wave from the output-wave generation and amplification device, wherein the output-wave adjuster is disposed between the output-wave transmission terminal and the output-wave transmitter, wherein the output-wave generation and amplification device includes: a power-supply terminal configured to supply external power; a power supply configured to supply the external power supplied through the power-supply terminal to a frequency generation module; the frequency generation module configured to be driven by the power supplied from the power supply to generate a frequency having a waveform; a waveform-shaping module configured to shape the waveform of the frequency generated by the frequency generation module; a power amplification module configured to amplify the frequency shaped through the waveform-shaping module; and an output-wave transmission terminal configured to transmit the output-wave to the output-wave transmitter. In one embodiment, the output-wave transmitter includes an emission coil. When the output-wave transmitter emits the output-wave into the air intake channel, the output wave vibrates moisture in air sucked through the air intake channel to decompose the moisture into oxygen and hydrogen.

In one embodiment, the system further comprises an output-wave amplifier between the output-wave adjuster and the output-wave transmitter wherein the output-wave amplifier is configured to further amplify the wavelength of the output-wave to be transmitted to the output-wave transmitter. In one embodiment, the system further comprises an output-wave distributor between the output-wave adjuster and the output-wave transmitter, wherein the output-wave transmitter includes a plurality of output-wave sub-transmitters installed along a longitudinal direction of the air intake channel, wherein the output-wave distributor is configured to distribute the output-wave between and to the plurality of output-wave sub-transmitters.

In one embodiment, the system further comprises a humidifier coupled to the air intake channel, wherein the humidifier is configured to further supply moisture into air sucked through the air intake channel, whereby decomposed oxygen and hydrogen via water decomposition using the output wave from the output-wave transmitter are supplied more into the engine. In one embodiment, the output-wave transmitter includes at least one emission coil, wherein the shape of the coil include a circular annular shape or a rod shape.

Advantageous Effects

According to the present disclosure, by decomposing the moisture in the air sucked into the air intake channel into oxygen and hydrogen, the hydrogen and oxygen can be completely burned in the internal combustion engine. As a result, compared with the prior art, the fuel consumption efficiency increases and the output increase can be maximized. Further, by decomposing the water into hydrogen and oxygen, corrosion of the internal combustion engine can be prevented by removing moisture from the air.

DETAILED DESCRIPTION

Hereinafter, preferred embodiments of the present disclosure will be described in detail with reference to the accompanying drawings so that those skilled in the art can readily implement the present disclosure.

Figure 1:
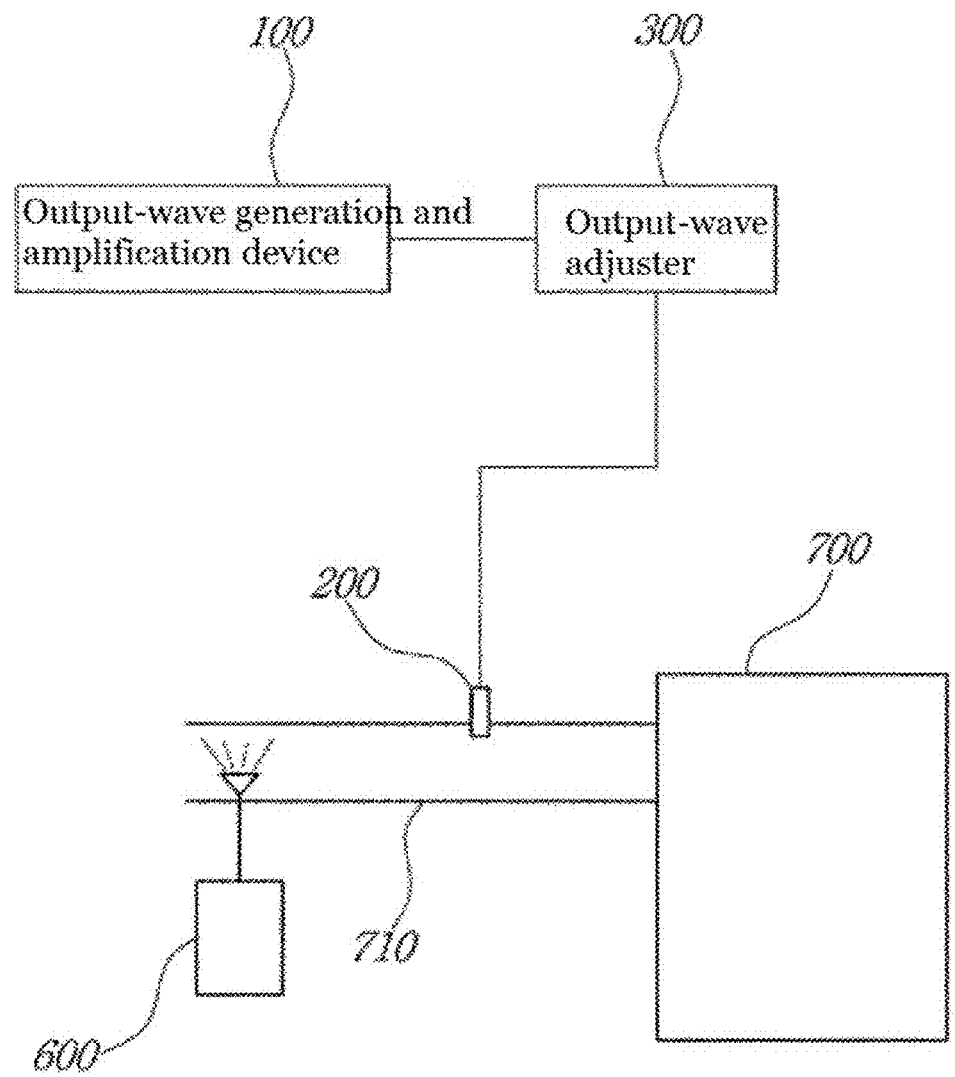
FIG. 1 is a basic block diagram of a system for reducing fuel consumption and increasing output of an internal combustion engine according to the present disclosure.
Figure 2:
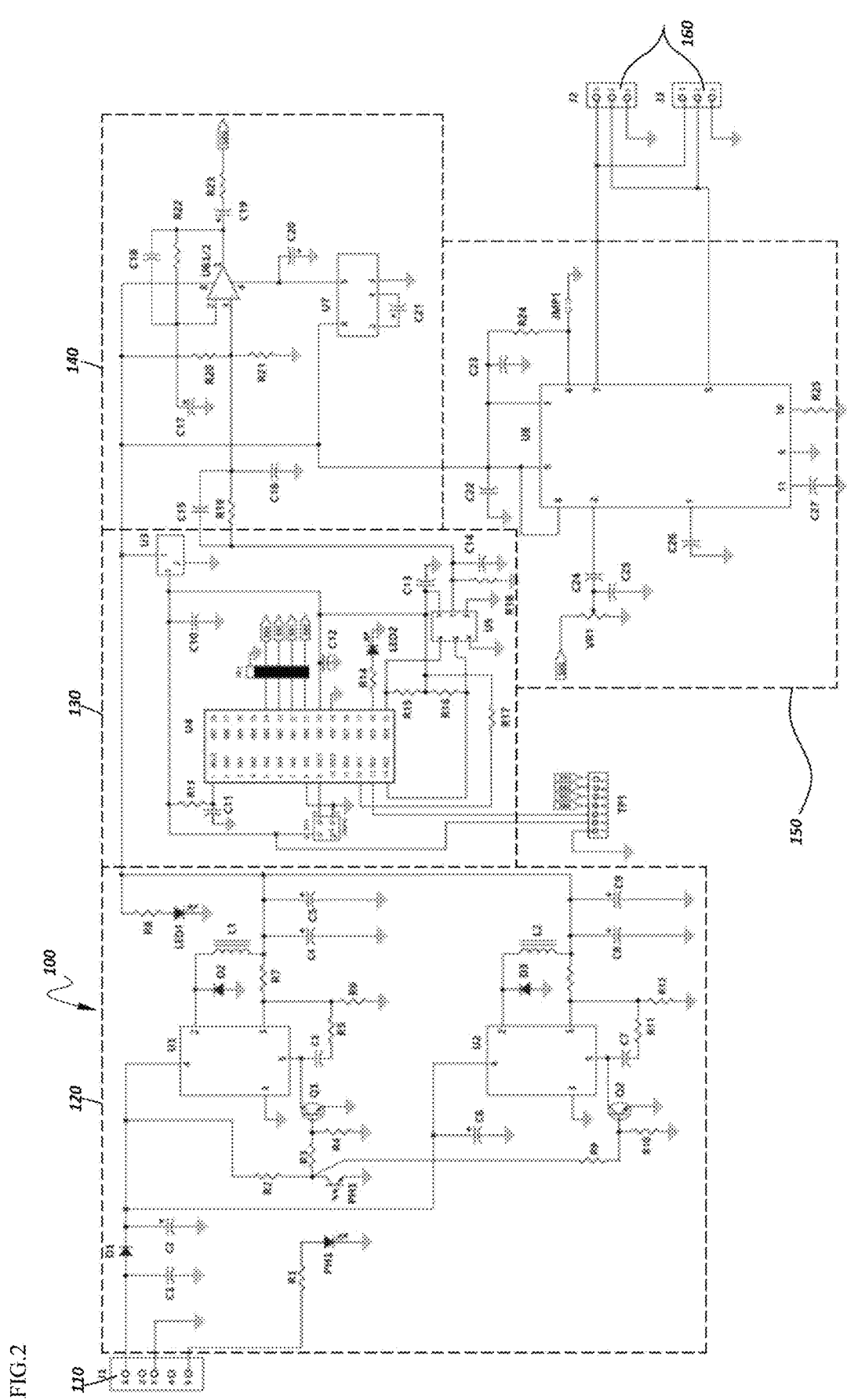
FIG. 2 is a circuit diagram of an output-wave generation and amplification device in a system for reducing fuel consumption and increasing output of an internal combustion engine according to the present disclosure.
Figure 3:
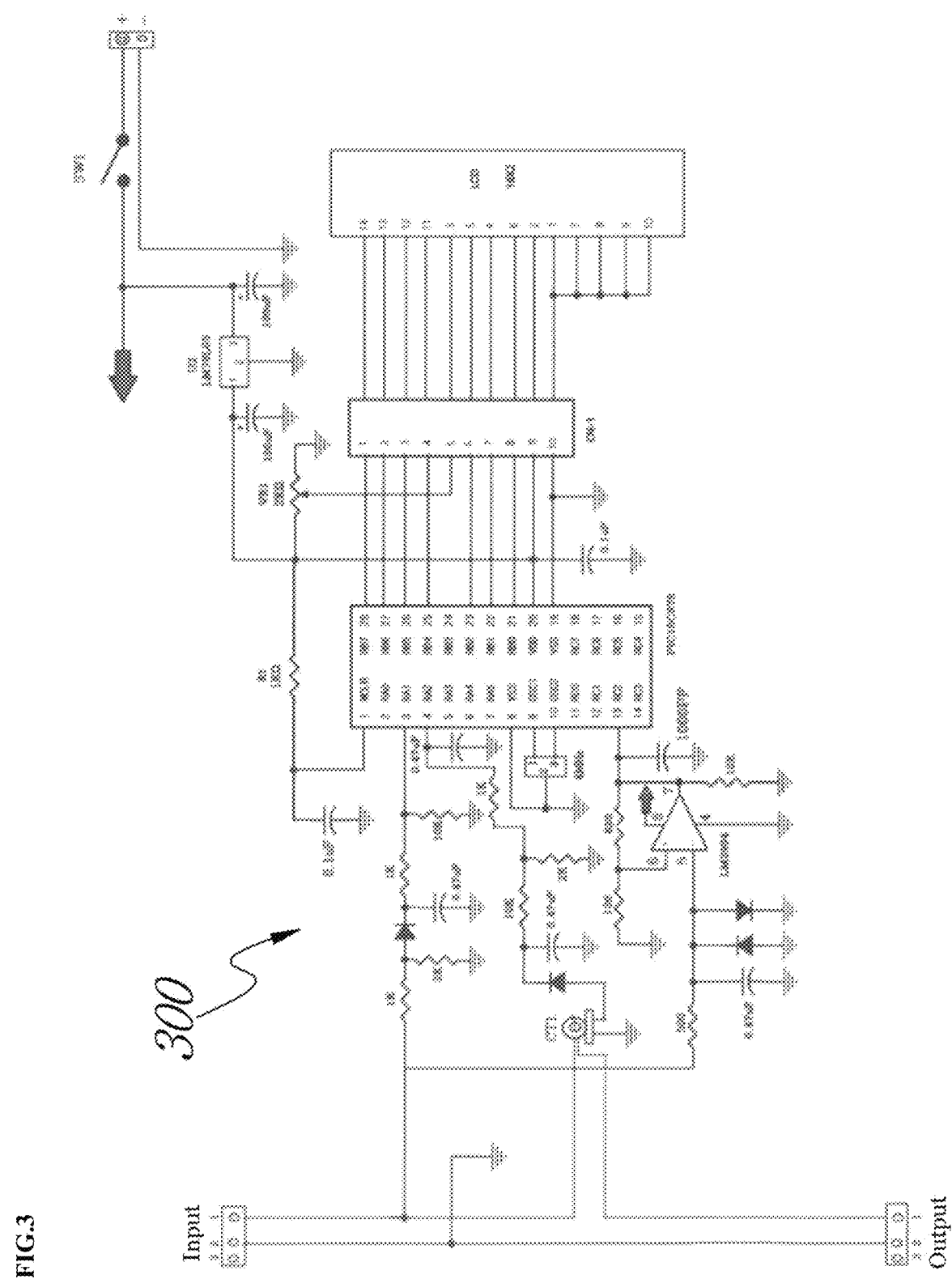
FIG. 3 is a circuit diagram of an output-wave adjuster in a system for reducing fuel consumption and increasing output of an internal combustion engine according to the present disclosure.

As shown in FIGS. 1 to 3, the system for reducing fuel consumption and increasing output of an internal combustion engine using an output-wave according to the present disclosure basically includes an output-wave generation and amplification device 100 configured to generated an amplified output-wave, and an output-wave transmitter 200 connected to the output-wave generation and amplification device 100 for transmitting an output-wave to an air intake channel 710 of an internal combustion engine 700.

In this connection, the output-wave generation and amplification device 100 includes a power-supply terminal 110 for supplying external power as an input terminal and includes an output-wave transmission terminal 160 configured to transmit the output-wave to the output-wave transmitter 200 as an output terminal.

The output-wave generation and amplification device 100 includes a power supply 120, a frequency generation module 130, a waveform-shaping module 140, and a power amplification module 150 in sequence between the power-supply terminal 110 and the output-wave transmission terminal 160.

Thus, the output-wave generation and amplification device 100 generates, shapes, and amplifies a frequency to generate an amplified output wave.

As a result, the output-wave is a type of a frequency of a few kHz to a few megahertz. The frequency may vary between an audible band and a non-audible band. In particular, the output wave may decompose moisture in the air into oxygen and hydrogen by vibrating the air. Therefore, it is preferable that the output wave is formed of a square wave having excellent resonance.

In this connection, the power supply 120 converts the external power supplied through the power-supply terminal 110 into an appropriate utility power that can be driven by the frequency generation module 130.

The power supply 120 supplies the converted power to the frequency generation module 130.

Next, the frequency generation module 130 is driven by the utility power supplied from the power supply 120 to generate a frequency having a waveform.

Subsequently, the waveform-shaping module 140 shapes the waveform of the frequency generated by the frequency generation module 130.

For example, the waveform-shaping module 140 adjusts the length of the AM frequency to form a square wave approximate to the FM frequency.

The power amplification module 150 amplifies the wavelength of the formed frequency through the waveform-shaping module 140. The amplified frequency is supplied to the output-wave transmission terminal 160. The output-wave transmission terminal 160 provides the output frequency to the output-wave transmitter 200, which, in turn, uses the output frequency to implement an output-wave.

In this connection, the output-wave generation and amplification device 100 preferably has all components from the power-supply terminal 110 to the output-wave transmission terminal 160 integrally formed on the PCB.

The output-wave transmitter 200 is connected to the output-wave transmission terminal 160 of the output-wave generation and amplification device 100. The output-wave transmitter 200 outputs an output-wave into the air intake channel 710. The output wave may vibrate the moisture in the air sucked through the air intake channel 710 to decompose the moisture into oxygen and hydrogen. To this end, the output-wave transmitter 200 is inserted into the air intake channel 710 for supplying external air to the internal combustion engine 700. The output-wave transmitter 200 has a plurality of emission coils 220 in the channel 710.

In this connection, the output-wave transmitter 200 generally transmits the output-wave using the emission coil 220. To both ends of the emission coil 220, conductive plates 210 are connected respectively. That is, the output-wave transmission terminal 160 is connected to the conductive plates 210, whereby the emission coil 220 emits the output-wave having resonance.

Eventually, while, on the one hand, the fuel gas is supplied into the internal combustion engine 700 through the fuel supply line of the internal combustion engine 700, on the other hand, through the air intake channel 710, air is supplied into the internal combustion engine 700. At the same time, the output-wave transmitter 200 emits an output-wave from the output-wave generation and amplification device 100 into the air intake channel 710 to vibrate the moisture in the supplied air therein, thereby decomposing the moisture into oxygen and hydrogen. The decomposed oxygen and hydrogen is fed to the internal combustion engine 700. As a result, the oxygen and hydrogen may be completely burned together with the fuel gas thereto.

In one embodiment, an output-wave adjuster 300 configured to adjust the output-wave from the output-wave generation and amplification device 100 may be disposed between the output-wave transmission terminal 160 and the output-wave transmitter 200.

In this connection, the output-wave adjuster 300 may typically have an LED lamp or display that allows the frequency band to be identified according to various colors.

In one embodiment, the present system may further comprise a humidifier 600. The humidifier further supplies moisture to the air sucked through the air intake channel 710. Thus, the decomposed oxygen and hydrogen via the water decomposition operation by the output-wave transmitter 200 connected to the output-wave generation and amplification device 100 may be supplied more into the engine 700.

In other words, this intends to maximize the supply of oxygen and hydrogen by increasing the amount of decomposition at the time of decomposing water into oxygen and hydrogen through the output-wave.

The system for reducing fuel consumption and increasing output of the internal combustion engine described above may be implemented into various embodiments in terms of their functional aspects.

<First Embodiment>

Figure 4:
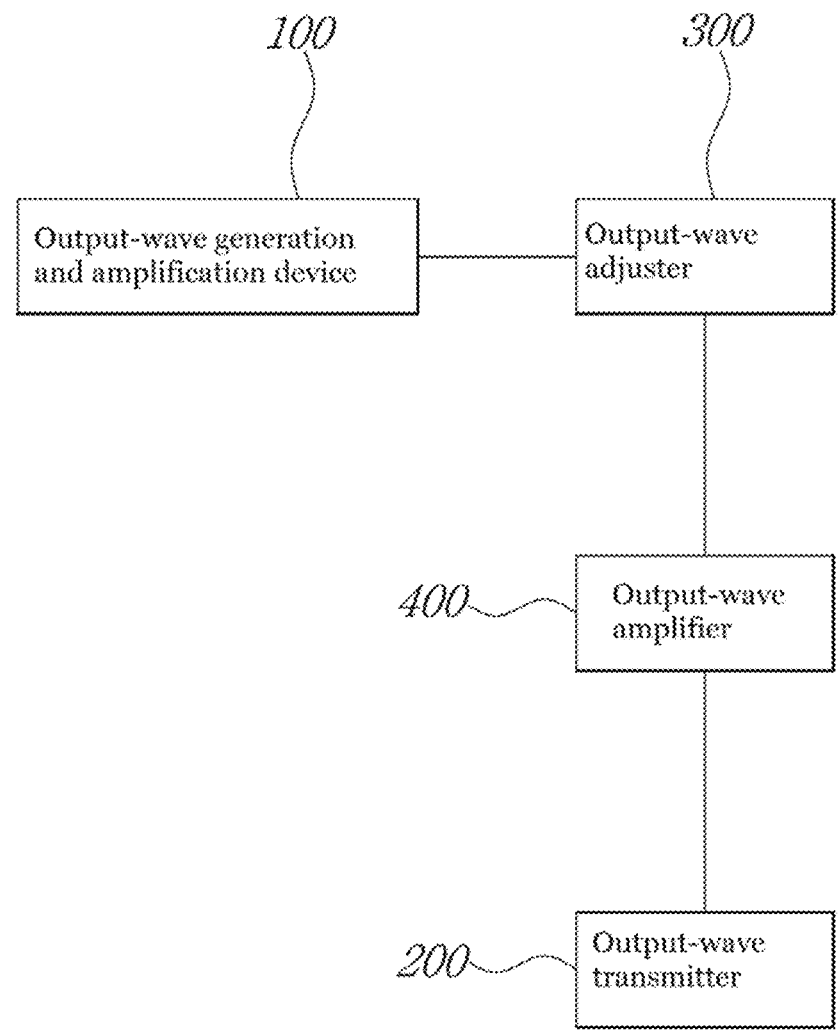
FIG. 4 is a block diagram illustrating a system for reducing fuel consumption and increasing output of an internal combustion engine according to a first embodiment of the present disclosure.

Referring to FIG. 4, the system for reducing fuel consumption and increasing output of the internal combustion engine further includes an output-wave amplifier 400 between the output-wave adjuster 300 and the output-wave transmitter 200. The output-wave amplifier 400 may be configured to further amplify the wavelength of the output-wave to be transmitted to the output-wave transmitter 200.

Thus, when the output-wave output from the output-wave generation and amplification device 100 is initially weak, the output-wave amplifier 400 is activated via the output-wave adjuster 300. Thus, the output of the output-wave transmitted to the output-wave transmitter 200 may be further increased.

<Second Embodiment>

Figure 5:
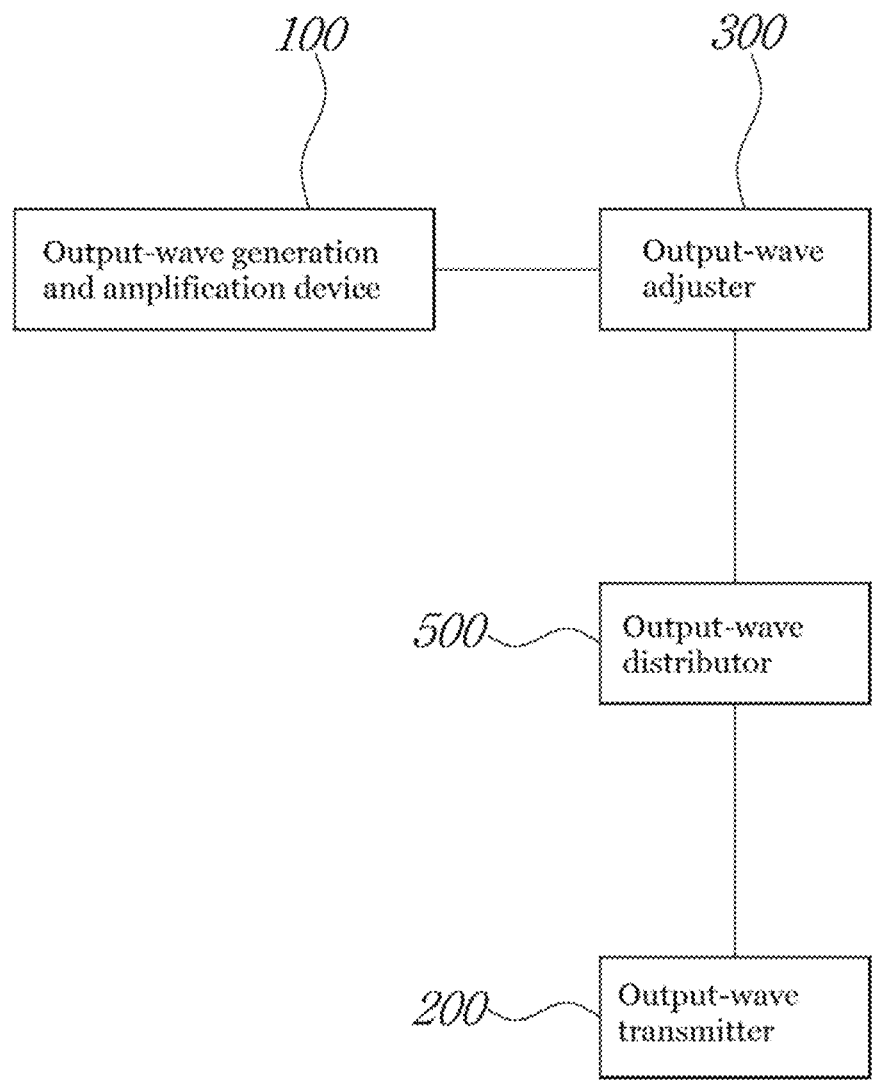
FIG. 5 is a block diagram showing a system for reducing fuel consumption and increasing output of an internal combustion engine according to a second embodiment of the present disclosure.

Referring to FIG. 5, the system for reducing fuel consumption and increasing output of the internal combustion engine further includes a output-wave distributor 500 between the output-wave adjuster 300 and the output-wave transmitter 200. In this connection, a plurality of output-wave transmitters 200 are installed along the longitudinal direction of the air intake channel 710. Thus, the output-wave distributor is configured to distribute the output-wave between and to the plurality of output-wave transmitters 200.

That is, together with increasing the number of the output-wave transmitters 200 to facilitate the decomposition of moisture in the air into oxygen and hydrogen, the output-wave of the same magnitude is fed to the plurality of output-wave transmitters 200 via the output-wave distributor 500.

<Third Embodiment>

Figure 6:
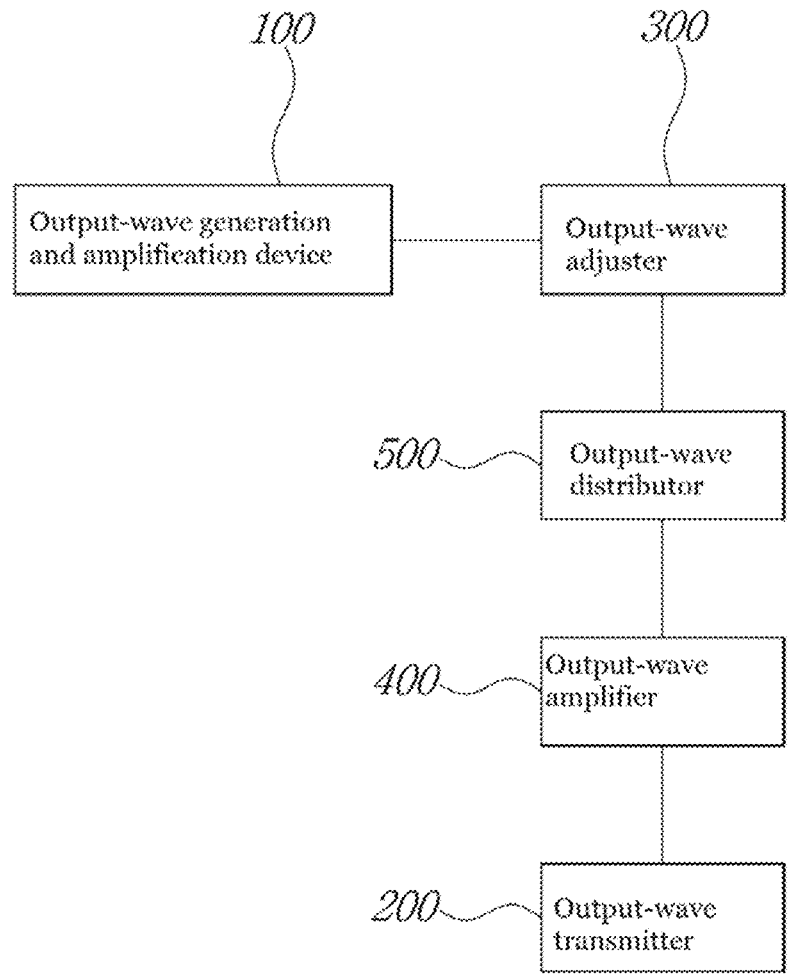
FIG. 6 is a block diagram of a system for reducing fuel consumption and increasing output of an internal combustion engine according to a third embodiment of the present disclosure.

Referring to FIG. 6, the system for reducing fuel consumption and increasing output of the internal combustion engine further includes an output-wave amplifier 400 between the output-wave adjuster 300 and the output-wave transmitter 200. The output-wave amplifier 400 may be configured to further amplify the wavelength of the output-wave to be transmitted to the output-wave transmitter 200. Further, the system for reducing fuel consumption and increasing output of the internal combustion engine further includes an output-wave distributor 500 between the output-wave adjuster 300 and the output-wave amplifier 400. In this connection, a plurality of output-wave transmitters 200 are installed along the longitudinal direction of the air intake channel 710. Thus, the output-wave distributor 500 is configured to distribute the output-wave between and to the plurality of output-wave transmitters 200.

In this way, when the output-wave output from the output-wave generation and amplification device 100 is initially weak, the output-wave amplifier 400 is activated via the output-wave adjuster 300. Thus, the output of the output-wave transmitted to the output-wave transmitter 200 may be further increased. Further, together with increasing the number of the output-wave transmitters 200 to facilitate the decomposition of moisture in the air into oxygen and hydrogen, the output-wave of the same magnitude is fed to the plurality of output-wave transmitters 200 via the output-wave distributor 500.

Figure 7:
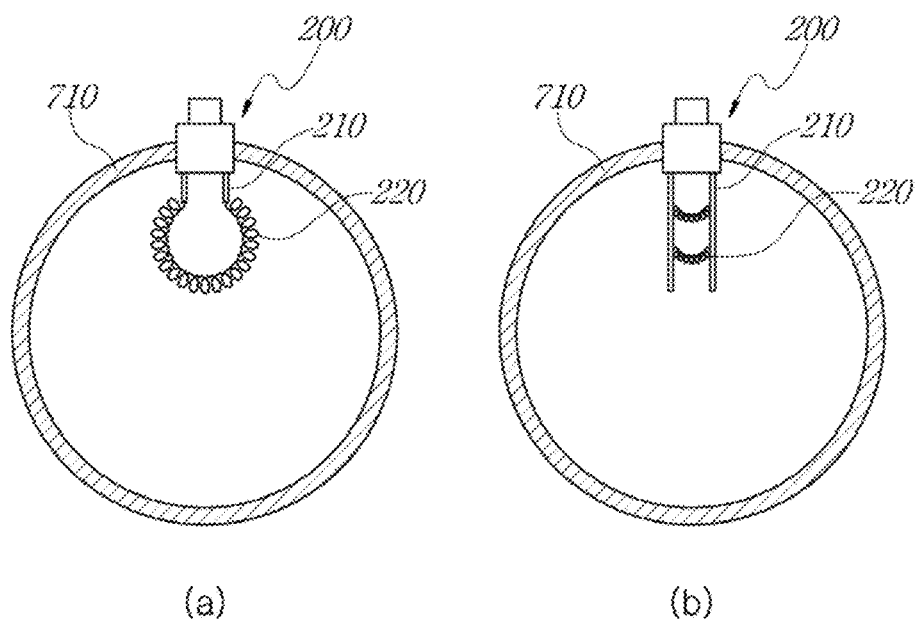
FIG. 7 is an illustration of a first embodiment of an output-wave transmitter in a system for reducing fuel consumption and increasing output of an internal combustion engine according to the present disclosure.

Referring to FIG. 7, the output-wave transmitter 200 includes the emission coil 220 and the conductive plates 210. The emission coil 220 may be efficiently installed while being disposed in the air intake channel 710. The emission coil 220 may be formed in a shape capable of aggressively performing the moisture decomposition operation. For example, the shape may include a circular annular or rod shape.

FIG. 7a shows a circular annular shape of the coil. In this case, the emission coil 220 is formed in a 'C' shape, and the conductive plates 210 are connected to both ends of the coil respectively. FIG. 7b shows the rod shape of the coil. In this case, the conductive plates 210 are elongated in a bar shape so as to be easily inserted into the air intake channel 710. The emission coil 220 is connected and extended to and between the conductive plates 210 facing each other.

Figure 8:
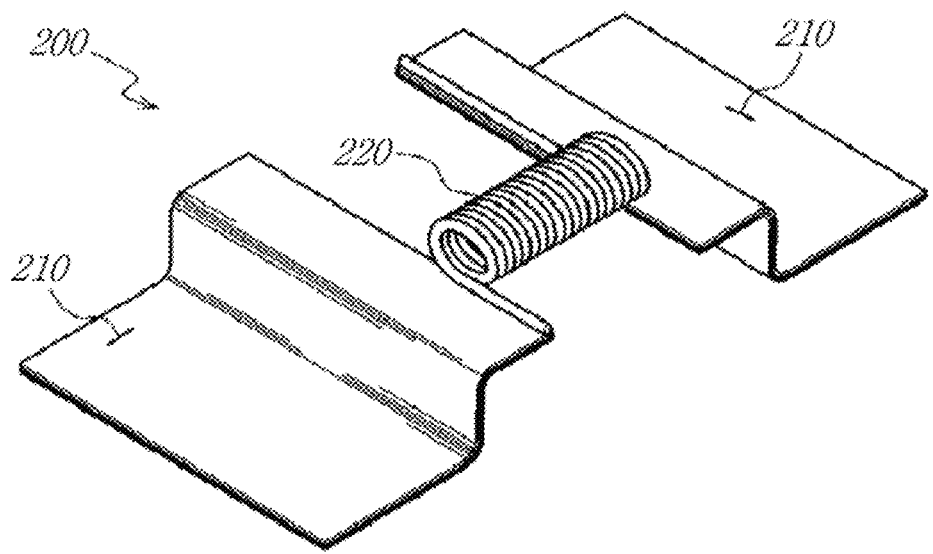
FIG. 8 is an illustration of a second embodiment of the out-wave transmitter in a system for reducing fuel consumption and increasing output of an internal combustion engine according to the present disclosure.
Figure 8:
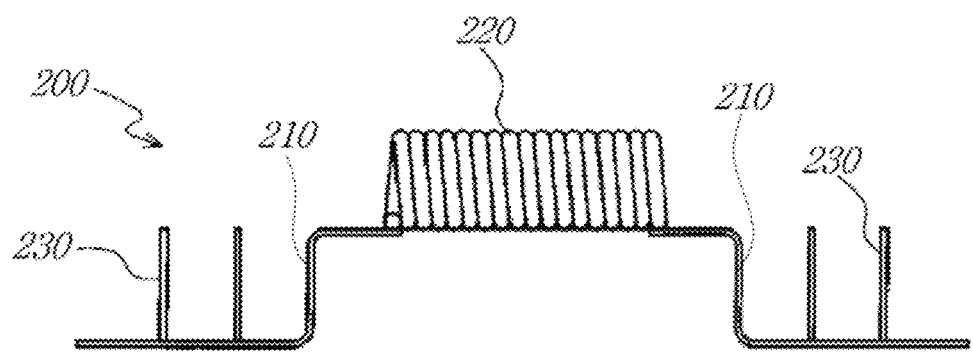

FIG. 8a shows an output-wave transmitter 200 having two opposing conductive plates 210, which are similarly folded, and an emission coil 220 connecting them. As shown in FIG. 8b, a plurality of pins 230 are vertically protruded from one surface of each of the conductive plates 210. This can increase the heat generating area of the conductive plates 210.

According to the present disclosure, by decomposing the moisture in the air sucked into the air intake channel into oxygen and hydrogen, the hydrogen and oxygen can be completely burned in the internal combustion engine. As a result, compared with the prior art, the fuel consumption efficiency increases and the output increase can be maximized. Further, by decomposing the water into hydrogen and oxygen, corrosion of the internal combustion engine can be prevented by removing moisture from the air.

In the above description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure. Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Examples of various embodiments are illustrated and described above. It will be understood that the description herein is not intended to limit the claims to the specific embodiments described. On the contrary, it is intended to cover alternatives, modifications, and equivalents as may be included within the spirit and scope of the present disclosure as defined by the appended claims.

REFERENCE NUMERALS

100: output-wave generation and amplification device
110: power-supply terminal
120: power supply
130: frequency generation module
140: waveform-shaping module
150: power amplification module
160: output-wave transmission terminal
200: output-wave transmitter
210: conductive plate
220: emission coil
300: output-wave adjuster
400: output-wave amplifier
500: output-wave distributor
600: humidifier
700: an internal combustion engine
710: air intake channel

What is claimed is:

1. A system for reducing fuel consumption and increasing output of an internal combustion engine using an output-wave, the system comprising:
    an output-wave generation and amplification device 100 configured to generated an amplified output-wave;
    an output-wave transmitter 200 connected to the output-wave generation and amplification device 100 for transmitting an output-wave to an air intake channel 710 of an internal combustion engine 700, wherein the output-wave transmitter 200 is inserted into the channel 710;
    an output-wave adjuster 300 configured to adjust the output-wave from the output-wave generation and amplification device 100, wherein the output-wave adjuster 300 is disposed between the output-wave transmission terminal 160 and the output-wave transmitter 200,
    wherein the output-wave generation and amplification device 100 includes:
    a power-supply terminal 110 configured to supply external power;
    a power supply 120 configured to supply the external power supplied through the power-supply terminal 110 to a frequency generation module 130;
    the frequency generation module 130 configured to be driven by the power supplied from the power supply 120 to generate a frequency having a waveform;
    a waveform-shaping module 140 configured to shape the waveform of the frequency generated by the frequency generation module 130;
    a power amplification module 150 configured to amplify the frequency shaped through the waveform-shaping module 140; and
    an output-wave transmission terminal 160 configured to transmit the output-wave to the output-wave transmitter 200,
    wherein the output-wave transmitter includes an emission coil,
    wherein when the output-wave transmitter 200 emits the output-wave into the air intake channel 710, the output wave vibrates moisture in air sucked through the air intake channel 710 to decompose the moisture into oxygen and hydrogen.

2. The system of claim 1, further comprising an output-wave amplifier 400 between the output-wave adjuster 300 and the output-wave transmitter 200, wherein the output-wave amplifier 400 is configured to further amplify the wavelength of the output-wave to be transmitted to the output-wave transmitter 200.

3. The system of claim 1, further comprising an output-wave distributor 500 between the output-wave adjuster 300 and the output-wave transmitter 200, wherein the output-wave transmitter 200 includes a plurality of output-wave sub-transmitters 200 installed along a longitudinal direction of the air intake channel 710, wherein the output-wave distributor 500 is configured to distribute the output-wave between and to the plurality of output-wave sub-transmitters 200.

4. The system of claim 1, further comprising:
an output-wave distributor 500 between the output-wave adjuster 300 and the output-wave transmitter 200, wherein the output-wave transmitter 200 includes a plurality of output-wave sub-transmitters 200 installed along a longitudinal direction of the air intake channel 710, wherein the output-wave distributor 500 is configured to distribute the output-wave between and to the plurality of output-wave sub-transmitters 200; and
a plurality of output-wave sub-amplifiers 400 disposed between the distributor 500 and the output-wave sub-transmitters 200 respectively, wherein the output-wave sub-amplifier 400 are respectively configured to further amplify the wavelengths of the output-waves to be transmitted to the output-wave sub-transmitter 200.

5. The system of claim 1, further comprising a humidifier 600 coupled to the air intake channel 710, wherein the humidifier is configured to further supply moisture into air sucked through the air intake channel 710, whereby decomposed oxygen and hydrogen via water decomposition using the output wave from the output-wave transmitter 200 are supplied more into the engine 700.

6. The system of claim 1, wherein the output-wave transmitter 200 includes at least one emission coil 220, wherein the shape of the coil include a circular annular shape or a rod shape.

* * * * *